(12) United States Patent
Han et al.

(10) Patent No.: US 10,945,066 B2
(45) Date of Patent: Mar. 9, 2021

(54) VIBRATION-PROOF FIXING STRUCTURE FOR VIBRATION-GENERATING COMPONENT AND ELECTRONIC DEVICE INCLUDING THE SAME

(71) Applicant: Samsung Electronics Co., Ltd., Gyeonggi-do (KR)

(72) Inventors: Brian Han, Gyeonggi-do (KR); Hwanmyung Noh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/414,886

(22) Filed: May 17, 2019

(65) Prior Publication Data

US 2019/0356983 A1 Nov. 21, 2019

(30) Foreign Application Priority Data

May 21, 2018 (KR) .................. 10-2018-0057609

(51) Int. Cl.
| | | |
|---|---|---|
| *G10H 1/047* | (2006.01) | |
| *H04R 1/28* | (2006.01) | |
| *H04R 1/02* | (2006.01) | |
| *F16F 1/373* | (2006.01) | |
| *H04R 7/16* | (2006.01) | |

(52) U.S. Cl.
CPC .......... *H04R 1/288* (2013.01); *F16F 1/3732* (2013.01); *H04R 1/025* (2013.01); *H04R 7/16* (2013.01); *F16F 2234/02* (2013.01); *H04R 2499/15* (2013.01)

(58) Field of Classification Search
CPC . H04R 2499/11; H04R 17/00; H04R 2400/03

USPC .............................................. 381/55, 61, 62
See application file for complete search history.

(56) References Cited

U.S. PATENT DOCUMENTS

| | | |
|---|---|---|
| 2013/0010994 A1 | 1/2013 | Liang |
| 2013/0156233 A1 | 6/2013 | Joo |
| 2014/0259565 A1 | 9/2014 | Hirama |

(Continued)

FOREIGN PATENT DOCUMENTS

| | | |
|---|---|---|
| JP | 2002-368166 A | 12/2002 |
| JP | 2010-87638 A | 4/2010 |
| KR | 10-0184134 B1 | 12/1998 |

(Continued)

OTHER PUBLICATIONS

International Search Report dated Aug. 28, 2019.

*Primary Examiner* — George C Monikang
(74) *Attorney, Agent, or Firm* — Cha & Reiter, LLC.

(57) ABSTRACT

A vibration-proof structure and electronic device utilizing the same is disclosed. The electronic device includes a housing in which a display or a circuit board is mounted. The electronic device further includes a vibration-generating component mounted within the housing a vibration-proof member coupled with the vibration-generating component, the vibration-proof member having an insertion hole formed centrally therein, and a fixing protrusion protruding from a surface of the housing, the fixing protrusion having an extended shoulder disposed at an end of the fixing protrusion, and inserted into the insertion hole of the vibration-proof member to dampen vibrations from the vibration-generating component when the housing is coupled to the vibration-proof member and the vibration-generating component.

20 Claims, 8 Drawing Sheets

(56) References Cited

U.S. PATENT DOCUMENTS

2017/0351164 A1   12/2017   Kim et al.

FOREIGN PATENT DOCUMENTS

| | | |
|---|---|---|
| KR | 10-2006-0016944 A | 2/2006 |
| KR | 10-2013-0071173 A | 6/2013 |
| KR | 10-2017-0024973 A | 3/2017 |
| KR | 10-2017-0136331 A | 12/2017 |

VIBRATION-PROOF FIXING STRUCTURE FOR VIBRATION-GENERATING COMPONENT AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2018-0057609, filed on May 21, 2018, in the Korean Intellectual Property Office, the disclosures of which are herein incorporated by reference in their entireties.

BACKGROUND

1. Technical Field

The present disclosure relates to an electronic device and, more particularly, to a vibration-proof fixing structure for securing a vibration-generating component within an electronic device.

2. Description of Related Art

Today, a great variety of electronic devices have become popularized. Modern-day electronic devices tend to be slimmer and lightweight in terms of design, and provide an increasing diversity of functions and applications.

Modern electronic devices may be equipped with various electronic components to provide various functions. Some of these components may generate vibrations during operation of the electronic device. Thus, unlike other components, these vibration-generating components benefit from measures that prevent unwanted vibration during their operation, such as vibration-proof structures.

As electronic device become slimmer, the available internal space of the electronic device is reduced. Accordingly, it is desirable that a vibration-proof structure used in tandem with a vibration-generating component occupy a small footprint within the electronic device.

Typically, when mounting a vibration-generating component in an electronic device, an additional part such as a dedicated screw is utilized to secure the vibration-generating component within the electronic device. However, the use an additional part such as the dedicated screw may increase an assembly time needed for manufacture of the electronic device. Moreover, there are difficulties associated with placing the additional part inside the electronic device, due to the size of the additional part.

SUMMARY

The present disclosure provides a vibration-proof fixing structure and an electronic device including the vibration-proof fixing structure. The vibration-proof fixing structure does not require an additional part such as a dedicated screw for securing a vibration-generating component to the electronic device. Therefore, the vibration-proof fixing structure does not unnecessarily occupy valuable space within the electronic device, and also increase assembly time for manufacturing the electronic device.

According to certain embodiments of the disclosure, a vibration-proof fixing structure may include a housing, a vibration-generating component mounted within a hollow of the housing, a vibration-proof member coupled with the vibration-generating component, the vibration-proof member having an insertion hole formed centrally therein, and a fixing protrusion protruding from a surface of the housing, the fixing protrusion having an extended shoulder disposed at an end of the fixing protrusion, and inserted into the insertion hole of the vibration-proof member to dampen vibrations from the vibration-generating component when the housing is coupled to the vibration-proof member and the vibration-generating component.

According to certain embodiments of the disclosure, an electronic device may include a housing, a display or a circuit board mounted at least partially within the housing, a vibration-generating component mounted within a hollow of the housing, a vibration-proof member coupled with the vibration-generating component, the vibration-proof member having an insertion hole formed centrally therein, and a fixing protrusion protruding from a surface of the housing, the fixing protrusion having an extended shoulder disposed at an end of the fixing protrusion, and inserted into the insertion hole of the vibration-proof member to dampen vibrations from the vibration-generating component when the housing is coupled to the vibration-proof member and the vibration-generating component.

An electronic device is disclosed, including a housing, a vibration-generating component mounted within a hollow of the housing, a vibration-proof member formed of an elastic material in a shape of a column, an insertion hole aligned to a longitudinal axis of the column, an engaging groove formed along an outer lateral surface of the vibration-proof member, wherein the vibration-proof member couples with the vibration-generating component through the engaging groove, and a fixing protrusion protruding from a surface of the housing, the fixing protrusion including an extended shoulder disposed at an end thereof, the fixing protrusion insertable into the insertion hole of the vibration-proof member to dampen vibrations from the vibration-generating component when the housing is coupled to the vibration-proof member and the vibration-generating component.

DETAILED DESCRIPTION

Figure 1:
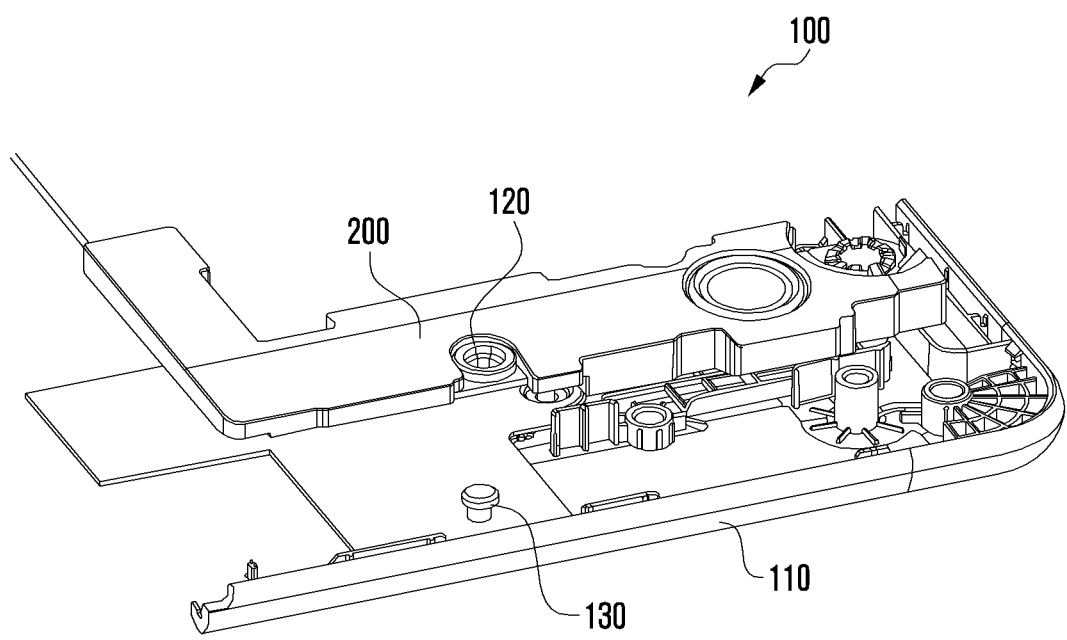
FIG. 1 is an exploded perspective view showing a vibration-proof fixing structure and a vibration-generating component in an electronic device according to an example embodiment of the disclosure.

Now, various embodiments of the disclosure will be described in detail with reference to the accompanying drawings. In the following description of embodiments, descriptions of techniques that are well known in the art and not directly related to the disclosure are omitted. This is to clearly convey the subject matter of the disclosure by omitting any unnecessary explanation.

Embodiments and terms used herein are not intended to limit the technology disclosed in specific forms and should be understood to include various modifications, equivalents, and/or alternatives to corresponding embodiments. In the drawings, similar reference numbers are used to indicate similar constituent elements. As used herein, singular forms are intended to include the plural forms as well, unless the context clearly indicates otherwise. In the disclosure, the expression "A or B" or "at least one of A and/or B" is intended to include any possible combination of enumerated items. In addition, expressions such as "1st" or "first", "2nd" or "second", etc. may modify various components regardless of the order and/or the importance but do not limit corresponding components. When it is mentioned that a (first) component is "connected" to or "accessed" by another (second) component, it may be understood that the component is directly connected to or accessed by the other component or that still other (third) component is interposed between the two components.

In the disclosure, the expression "configured to ~" may be interchangeably used with the expressions "suitable for ~", "having a capability of ~", "changed to ~", "made to ~", "capable of ~", and "designed for" in hardware or software. The expression "device configured to ~" may denote that the device is "capable of ~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

FIG. 1 is an exploded perspective view showing a vibration-proof fixing structure and a vibration-generating component in an electronic device according to an example embodiment of the disclosure.

A particular component 200 that generates a vibration during operation will be hereinafter referred to as "vibration-generating component" (e.g., a hard drive, a speaker, etc.). The vibration-proof fixing structure may be used to mount, affix, attach or otherwise secure the vibration-generating component 200 in the electronic device 100, so as to prevent a vibration generated by the vibration-generating component 200 from being transmitted to other components of the electronic device 100.

In an embodiment, the vibration-proof fixing structure may include a housing 110, a vibration-proof member 120, and a fixing protrusion 130.

The housing 110 may be a basic frame of the electronic device 100 that forms an outward appearance of all or part of the electronic device 100. For example, the housing 110 may form the external appearance of the electronic device 100, and thus serve as the external casing of a smart phone, a portable terminal, or a laptop computer. Various components of the electronic device 100 may be installed or mounted within the housing, such as a display and a printed circuit board, in addition to the vibration-generating component 200.

The vibration-proof member 120 may be combined with the vibration-generating component 200, as will be described below in greater detail. The vibration-proof member 120 fastens the vibration-generating component 200 to the housing 110, and also blocks or absorbs a vibration between the vibration-generating component 200 and the housing 110. Specifically, the vibration-proof member 120 includes an insertion hole 121 (or insertion "opening," see FIG. 3A) formed centrally therein, and the fixing protrusion 130 protruding on the housing 110 is inserted into and engaged with the insertion hole 121, which fasten the vibration-generating component 200 to the housing 110. The vibration-proof member 120 may be formed of an elastic material to block or absorb any vibration between the vibration-generating component 200 and the housing 110.

The fixing protrusion 130 is formed to protrude from a surface of the housing 110 and has an extended shoulder 131 (see FIG. 4) at an end thereof. The extended shoulder 131 extends outwardly from the end of the fixing protrusion 130, and may have a diameter greater than the diameter of the insertion hole 121 of the vibration-proof member 120. Therefore, when coupled together, the vibration-proof member 120 may be firmly affixed with the fixing protrusion 130, whereas detachment is resisted.

The fixing protrusion 130 may in some examples include (but is not limited to) a PEM bolt or a self-clinching bolt. The fixing protrusion 130 may be used to be fastened to a thin, ductile, or non-ductile metal plate using a press-fitting, broaching, or surface mounting technique. The type or shape of the fixing protrusion 130 is not limited to specific examples, and may be modified as appropriate according to an object to which the fixing protrusion 130 is to be applied.

Figure 2:
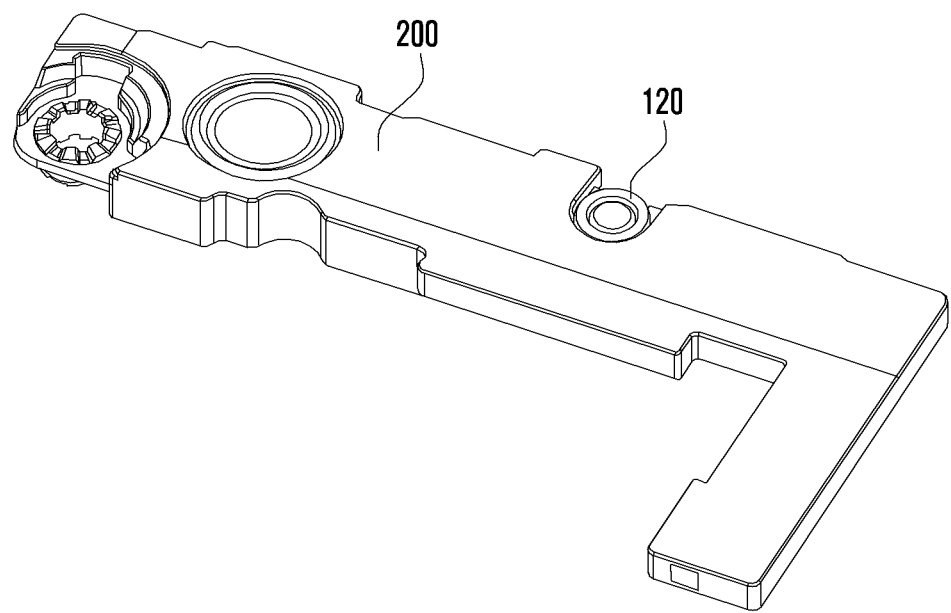
FIG. 2 is a perspective view showing a vibration-generating component according to an example embodiment of the disclosure.

FIG. 2 is a perspective view showing a vibration-generating component according to an example embodiment of the disclosure.

As mentioned above, the vibration-generating component 200 refers to a particular component that generates a vibration during operation. For example, FIG. 2 shows a speaker module as the vibration-generating component 200. This is, however, an example only and not construed as a limitation of the disclosure. Although not shown, the vibration-generating component may include other vibration-generating components, such as a hard disk drive (HDD).

Figure 3A:
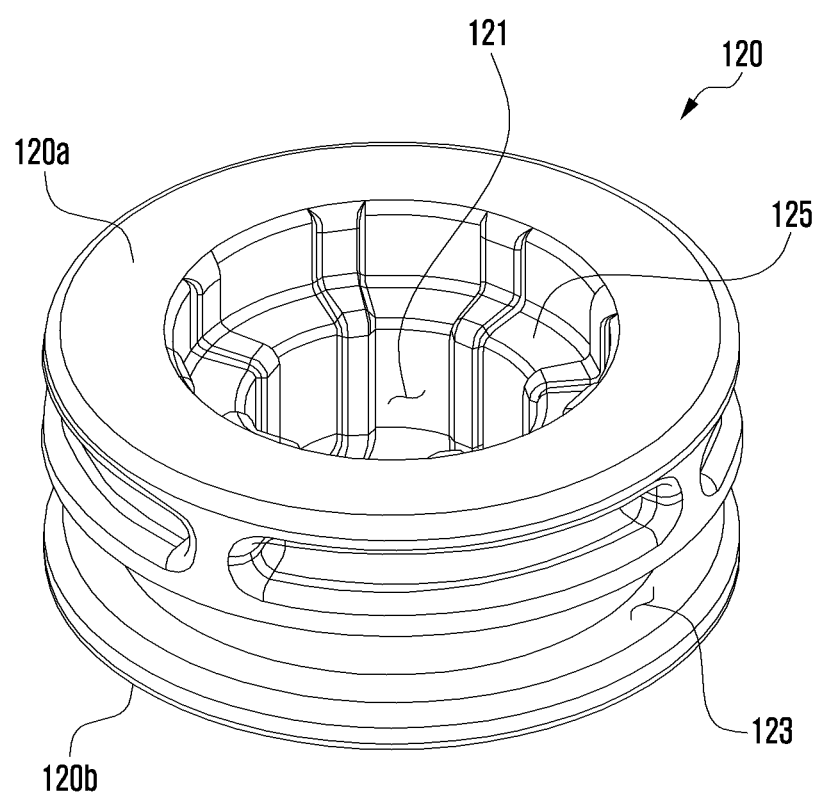
FIG. 3A is a perspective view showing a vibration-proof member according to an example embodiment of the disclosure.
Figure 3B:
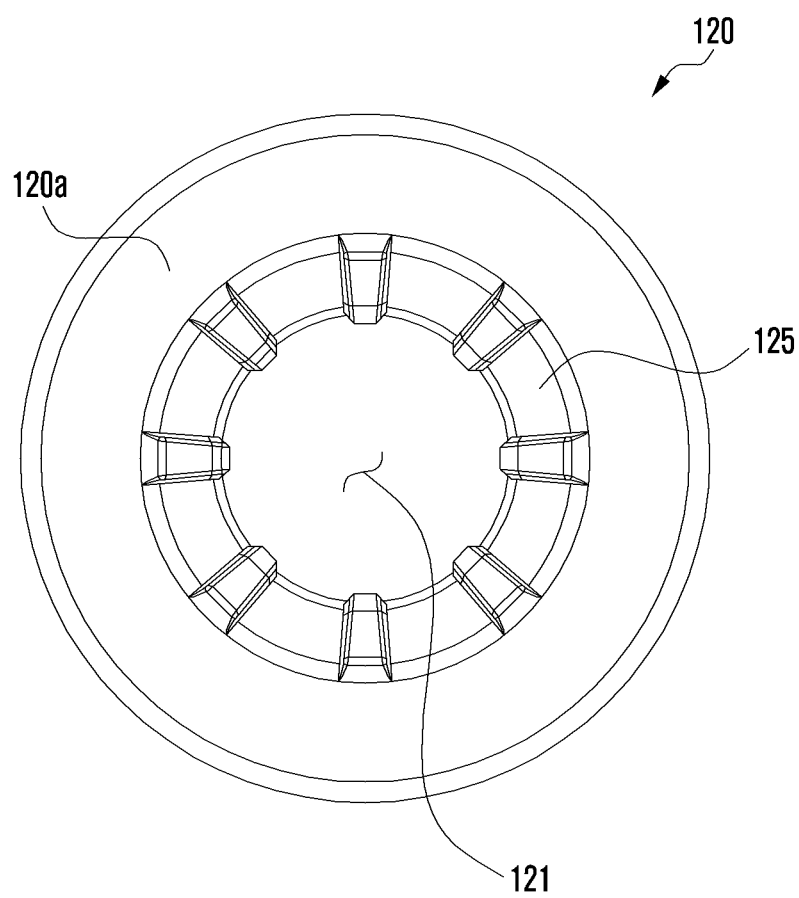
FIG. 3B is a top plan view showing a vibration-proof member according to an example embodiment of the disclosure.
Figure 3C:
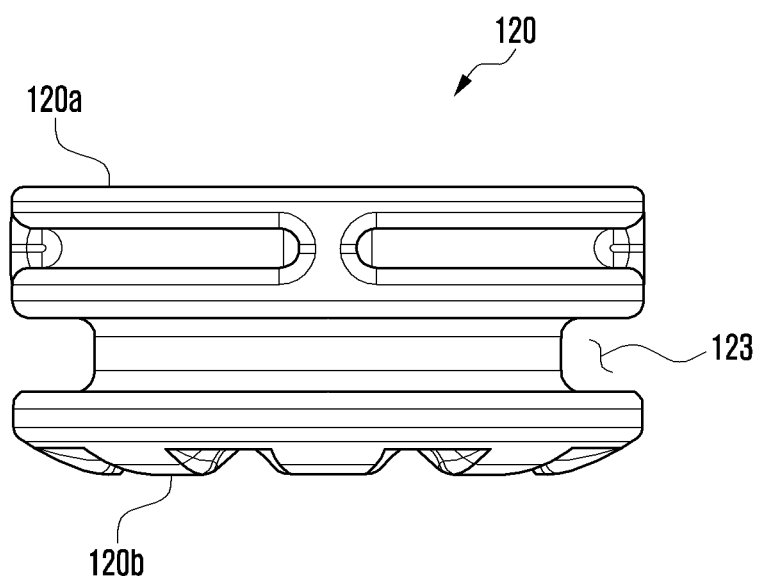
FIG. 3C is a front view showing a vibration-proof member according to an example embodiment of the disclosure.

FIGS. 3A, 3B and 3C are a perspective view, a top plan view, and a front view, respectively showing a vibration-proof member according to an example embodiment of the disclosure.

As shown in FIGS. 3A to 3C, the vibration-proof member 120 may be formed in a columnar shape, in which the insertion hole 121 may be formed at the center thereof. For example, the vibration-proof member 120 may be formed in a cylindrical shape, a polygonal columnar shape, or any other columnar shape. The vibration-proof member 120 may include an engaging groove 123 formed along an outer lateral surface thereof. The engaging groove 123 may be formed such that it recesses inwardly in a horizontal direction, and may be securely coupled with the vibration-generating component 200.

The vibration-proof member 120 may further include a supportable abutment 125 formed in the insertion hole 121, disposed biased towards an upper end (or surface) 120a thereof. The supportable abutment 125 may define a recessed portion in the insertion hole 121 to support the extended shoulder 131 (see FIG. 4) of the fixing protrusion 130 (see FIG. 4). The diameter of the supportable abutment 125 may correspond to the diameter of the extended shoulder 131, and the depth of the supportable abutment 125 may correspond to the thickness of the extended shoulder 131.

Figure 4:
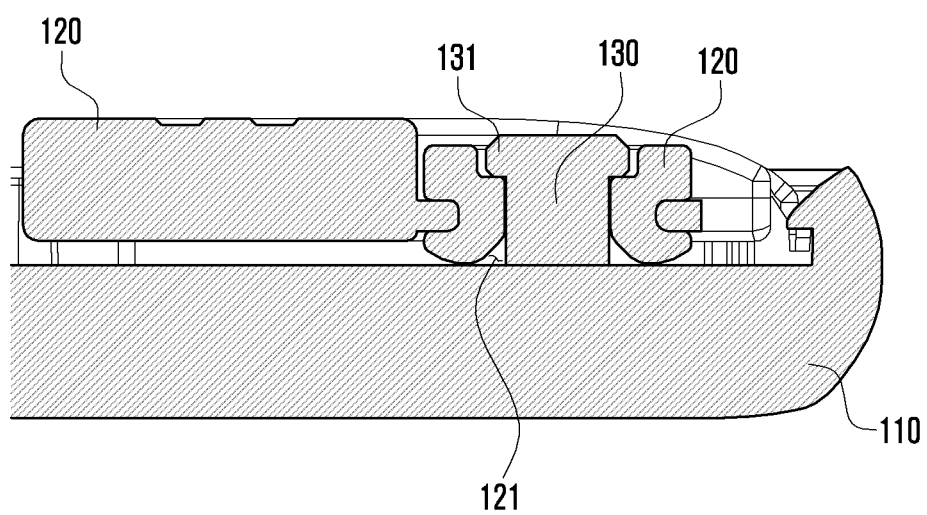
FIG. 4 is a cross-sectional view showing a vibration-proof fixing structure according to an example embodiment of the disclosure.

A lower end (or surface) 120b of the vibration-proof member 120 is disposed opposite to the upper end 120a, and may be oriented towards (e.g., face) the housing 110 during coupling (see FIG. 4). At the lower end 120b, the vibration-proof member 120 may have a curved surface formed smoothly and continuously around the insertion hole 121, at a predetermined degree of curvature.

FIG. 4 is a cross-sectional view showing a vibration-proof fixing structure according to an example embodiment of the disclosure.

As shown in FIG. 4, the fixing protrusion 130 may be formed in the shape of cylinder that protruding from a surface of the housing 110. An upper portion of the fixing protrusion 130 may include an increased diameter and thus form the extended shoulder 131 extending outwardly from one end of the cylinder. Edges of the extended shoulder 131 may be chamfered.

The vibration-proof member 120 may have a curved surface around the insertion hole 121, disposed at the lower end 120b (see FIG. 3C), as described above. Also, the extended shoulder 131 of the fixing protrusion 130 may be chamfered at edges, as described above. Therefore, the fixing protrusion 130 is insertable into the insertion hole 121 of the vibration-proof member 120.

In addition, as described above, the vibration-proof member 120 includes the supportable abutment 125 (see FIG. 3A) formed in the insertion hole 121 at the upper end 120a (see FIG. 3A) thereof. After insertion, the supportable abutment 125 may be engaged with the extended shoulder 131 of the fixing protrusion 130, such that the vibration-proof member 120 is securely affixed to the fixing protrusion 130. Therefore, the vibration-generating component 200 may be fastened to the housing 110 quickly and easily, which also prevents a vibration generated in the vibration-generating component 200 from being transmitted to the housing 110 or the electronic device 100.

The depth of the supportable abutment 125 of the vibration-proof member 120 may correspond to the thickness of the extended shoulder 131 of the fixing protrusion 130, such that the fixing protrusion 130 does not protrude from the upper end 120a (see FIG. 3A) of the vibration-proof member 120. Therefore, the thickness of the vibration-proof fixing structure may be reduced, which in turn requires less space within the electronic device 100, which further enables the electronic device 100 to be designed with a thinner or otherwise more compact overall form.

Figure 5:
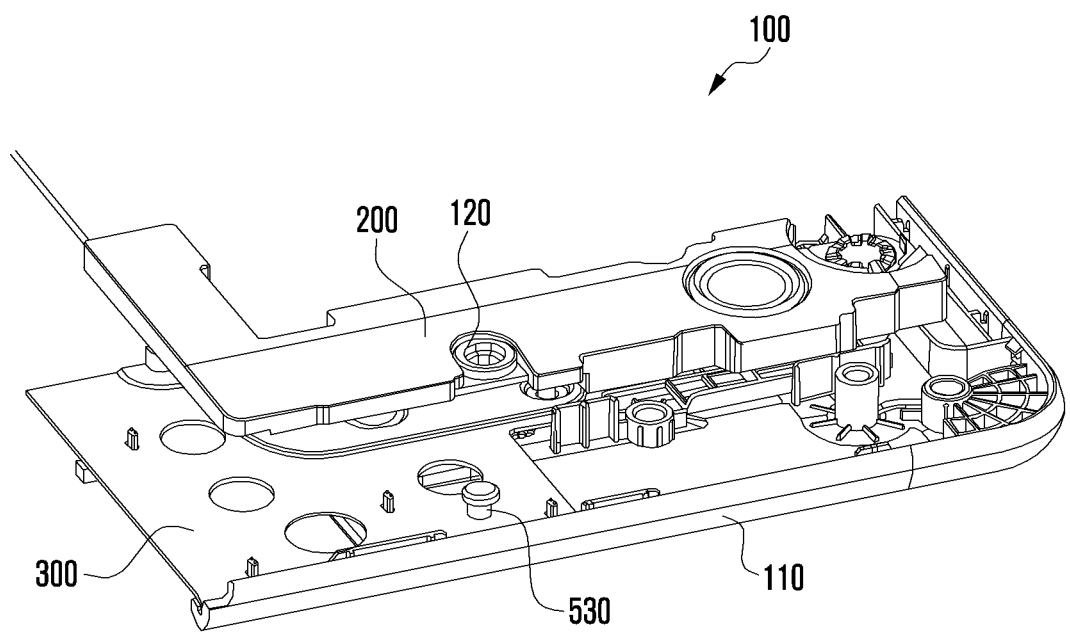
FIG. 5 is an exploded perspective view showing a vibration-proof fixing structure and a vibration-generating component in an electronic device according to another example embodiment of the disclosure.

FIG. 5 is an exploded perspective view showing a vibration-proof fixing structure and a vibration-generating component in an electronic device according to another example embodiment of the disclosure.

In another embodiment, the vibration-proof fixing structure may include a housing 110, a reinforcing plate 300, a vibration-proof member 120, and a fixing protrusion 530. Compared with the above-described embodiment of FIG. 1, the vibration-proof fixing structure according to another embodiment may further include the reinforcing plate 300.

The housing 110 may be a basic frame of the electronic device 100 that forms an external appearance of all or part of the electronic device 100. Within the housing 110, various components of the electronic device 100 may be mounted, such as a display, a printed circuit board and the vibration-generating component 200.

The vibration-proof member 120 may be combined with the vibration-generating component 200, as described above. The vibration-proof member 120 may operate to fasten the vibration-generating component 200 to the housing 110, and further operate to block or absorb a vibration, preventing the vibration from transferring from the vibration-generating component 200 to the housing 110. The vibration-proof member 120 may include an insertion hole 121 (see FIG. 3A) formed centrally therein, and the fixing protrusion 130 protruding on the housing 110 may be inserted into and engaged with the insertion hole 121 to fasten the vibration-generating component 200 to the housing 110. The vibration-proof member 120 may be formed of an elastic material to block or absorb a vibration between the vibration-generating component 200 and the housing 110.

In this embodiment, the reinforcing plate 300 may be disposed within the housing 110. In the housing 110, various components may be densely arranged or stacked within a limited space. The reinforcing plate 300 may be used to compensate for a thickness difference between such components, when the components include various sizes (e.g., especially thicknesses) and/or to reinforce the strength of the housing 110.

In this embodiment, the fixing protrusion 530 is formed as to protrude from a surface of the reinforcing plate 300, and include an extended shoulder 131 (see FIG. 4) at an end thereof. The extended shoulder 131 extends outwardly from the end of the fixing protrusion 130, and may include a diameter greater than the diameter of the insertion hole 121 of the vibration-proof member 120. Therefore, the two may be securely coupled to one another, such that the vibration-proof member 120 is resistant to detachment from the fixing protrusion 130.

Figure 6:
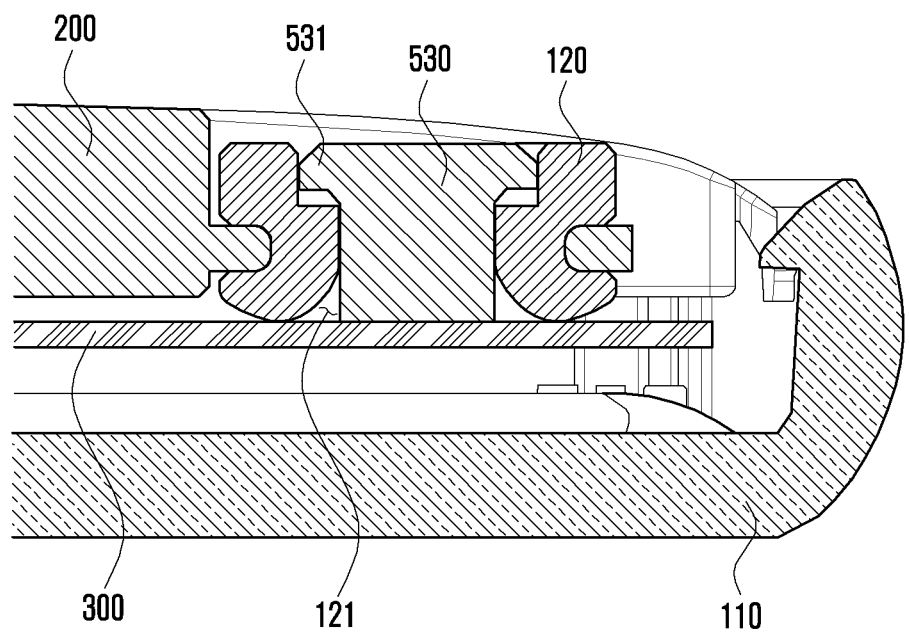
FIG. 6 is a cross-sectional view showing a vibration-proof fixing structure according to another example embodiment of the disclosure.

FIG. 6 is a cross-sectional view showing a vibration-proof fixing structure according to another example embodiment of the disclosure.

As shown in FIG. 6, the fixing protrusion 530 may be formed in the shape of a cylinder protruding from a surface of the reinforcing plate 300. An upper portion of the fixing protrusion 530 may include an increased diameter and thus form the extended shoulder 531, extending outwardly from one end of the cylinder. Edges of the extended shoulder 531 may be chamfered.

The vibration-proof member 120 may include a curved surface around the insertion hole 121, as disposed at the lower end (or surface) 120b (see FIG. 3C), as described above. Also, the extended shoulder 531 of the fixing protrusion 530 may be chamfered at the edges, as described above. Accordingly, the fixing protrusion 530 may be more easily inserted into the insertion hole 121 of the vibration-proof member 120.

In addition, as described above, the vibration-proof member 120 may include the supportable abutment 125 (see FIG. 3A) formed in the insertion hole 121 at the upper end 120a (see FIG. 3A) thereof. After insertion, the supportable abutment 125 may be engaged with the extended shoulder 531 of the fixing protrusion 530, such that the vibration-proof member 120 is securely attached to the fixing protrusion 530. Therefore, the vibration-generating component 200 is more easily fastened to the housing 110, and vibrations generated in the vibration-generating component 200 are prevented from being transmitted to the housing 110 or the electronic device 100.

The depth of the supportable abutment 125 of the vibration-proof member 120 may correspond to the thickness of the extended shoulder 531 of the fixing protrusion 530, so that the fixing protrusion 530 does not protrude from the upper end 120a (see FIG. 3A) of the vibration-proof member 120. Therefore, the thickness of the vibration-proof fixing structure disposed within the electronic device 100 may be reduced, which further allows overall form of the electronic device 100 to be thinner.

According to an embodiment of the disclosure, a vibration-proof fixing structure may include a housing in which a vibration-generating component is mounted, a vibration-proof member combined with the vibration-generating component and having an insertion hole formed centrally therein, and a fixing protrusion protruding from a surface of the housing, having an extended shoulder at an end thereof, and inserted into and engaged with the insertion hole of the vibration-proof member.

In the vibration-proof fixing structure, the vibration-proof member may be made of an elastic material.

In the vibration-proof fixing structure, the vibration-proof member may be formed in a columnar shape and may further have an engaging groove formed along an outer lateral surface thereof.

In the vibration-proof fixing structure, the vibration-proof member may further have a supportable abutment formed in the insertion hole at an upper end thereof to support the extended shoulder of the fixing protrusion.

In the vibration-proof fixing structure, the vibration-proof member may further have a curved surface formed at a lower end thereof opposite to the upper end.

In the vibration-proof fixing structure, the fixing protrusion may be formed in a shape of a cylinder having a diameter corresponding to a diameter of the insertion hole of the vibration-proof member, and the extended shoulder of the fixing protrusion may be outwardly extended from one end of the cylinder and have an increased diameter greater than the diameter of the insertion hole of the vibration-proof member.

In the vibration-proof fixing structure, the supportable abutment of the vibration-proof member may have a depth corresponding to a thickness of the extended shoulder of the fixing protrusion.

The vibration-proof fixing structure may further include a reinforcing plate fastened to the surface of the housing, and the fixing protrusion may be formed on the reinforcing plate.

In the vibration-proof fixing structure, the vibration-generating component may be a speaker.

According to another embodiment of the disclosure, an electronic device may include a housing in which a display or a circuit board is mounted, a vibration-generating component mounted in the housing and generating a vibration during operation, a vibration-proof member combined with the vibration-generating component and having an insertion hole formed centrally therein, and a fixing protrusion protruding from a surface of the housing, having an extended shoulder at an end thereof, and inserted into and engaged with the insertion hole of the vibration-proof member.

In the electronic device, the vibration-proof member may be made of an elastic material.

In the electronic device, the vibration-proof member may be formed in a columnar shape and may further have an engaging groove formed along an outer lateral surface thereof.

In the electronic device, the vibration-proof member may further have a supportable abutment formed in the insertion hole at an upper end thereof to support the extended shoulder of the fixing protrusion.

In the electronic device, the vibration-proof member may further have a curved surface formed at a lower end thereof opposite to the upper end.

In the electronic device, the fixing protrusion may be formed in a shape of a cylinder having a diameter corresponding to a diameter of the insertion hole of the vibration-proof member, and the extended shoulder of the fixing protrusion may be outwardly extended from one end of the cylinder and have an increased diameter greater than the diameter of the insertion hole of the vibration-proof member.

In the electronic device, the supportable abutment of the vibration-proof member may have a depth corresponding to a thickness of the extended shoulder of the fixing protrusion.

The electronic device may further include a reinforcing plate fastened to the surface of the housing, and the fixing protrusion may be formed on the reinforcing plate.

In the electronic device, the vibration-generating component may be a speaker.

According to still another embodiment of the disclosure, an electronic device may include a housing, a vibration-generating component mounted in the housing and generating a vibration during operation, a vibration-proof member formed in a shape of a column, made of an elastic material, having an insertion hole penetrating along a longitudinal direction of the column, having an engaging groove formed along an outer lateral surface thereof, and combined with the vibration-generating component through the engaging groove, and a fixing protrusion protruding from a surface of the housing, having an extended shoulder at an end thereof, and inserted into and engaged with the insertion hole of the vibration-proof member.

In the electronic device, the vibration-proof member may further have a supportable abutment formed in the insertion hole at an upper end thereof, having a depth corresponding to a thickness of the extended shoulder of the fixing protrusion, and supporting the extended shoulder of the fixing protrusion.

While the disclosure has been particularly shown and described with reference to example embodiments thereof, it will be understood by those skilled in the art that various changes in form and details may be made therein without departing from the subject matter as defined by the appended claims.

What is claimed is:

1. A vibration-proof fixing structure comprising:
a housing;
a vibration-generating component within the housing;
a vibration-proof member coupled with the vibration-generating component, the vibration-proof member having an insertion hole formed centrally therein; and
a fixing protrusion protruding from a surface of the housing, the fixing protrusion having an extended shoulder disposed at an end of the fixing protrusion, and inserted into the insertion hole of the vibration-proof member,
wherein the fixing protrusion is configured to be inserted to the insertion hole such that the vibration-proof member prevents vibrations generated in the vibration-generating component from being transmitted to the fixing protrusion inserted to the insertion hole.

2. The vibration-proof fixing structure of claim 1, wherein the vibration-proof member is formed of an elastic material.

3. The vibration-proof fixing structure of claim 2, wherein the vibration-proof member is formed in a columnar shape and includes an engaging groove formed along an outer lateral surface thereof.

4. The vibration-proof fixing structure of claim 3, wherein the vibration-proof member further includes a supportable abutment formed on an entirety of a circumference for an interior of the insertion hole, the supportable abutment disposed at an upper end of the vibration-proof member to support the extended shoulder of the fixing protrusion.

5. The vibration-proof fixing structure of claim 4, wherein the vibration-proof member further includes a curved surface at a lower end of the vibration-proof member disposed opposite to the upper end.

6. The vibration-proof fixing structure of claim 1, wherein the fixing protrusion is formed as a cylinder having a diameter corresponding to a diameter of the insertion hole of the vibration-proof member, and
wherein the extended shoulder of the fixing protrusion extends outwardly from one end of the cylinder, and has a diameter greater than the diameter of the insertion hole of the vibration-proof member.

7. The vibration-proof fixing structure of claim 4, wherein the supportable abutment of the vibration-proof member has a depth corresponding to a thickness of the extended shoulder of the fixing protrusion.

8. The vibration-proof fixing structure of claim 1, further comprising:
a reinforcing plate fastened to the surface of the housing, wherein the fixing protrusion is formed on the reinforcing plate.

9. The vibration-proof fixing structure of claim 1, wherein the vibration-generating component is a speaker.

10. An electronic device comprising:
a housing;
a display or a circuit board mounted at least partially within the housing;
a vibration-generating component mounted within a hollow of the housing;
a vibration-proof member coupled with the vibration-generating component, the vibration-proof member having an insertion hole formed centrally therein; and
a fixing protrusion protruding from a surface of the housing, the fixing protrusion having an extended shoulder disposed at an end of the fixing protrusion, and inserted into the insertion hole of the vibration-proof member,
wherein the fixing protrusion is configured to be inserted to the insertion hole such that the vibration-proof member prevents vibrations generated in the vibration-generating component from being transmitted to the fixing protrusion inserted to the insertion hole.

11. The electronic device of claim 10, wherein the vibration-proof member is formed of an elastic material.

12. The electronic device of claim 11, wherein the vibration-proof member is formed in a columnar shape and includes an engaging groove formed along an outer lateral surface thereof.

13. The electronic device of claim 12, wherein the vibration-proof member further includes a supportable abutment formed on an entirety of a circumference for an interior of the insertion hole, the supportable abutment disposed at an upper end of the vibration-proof member to support the extended shoulder of the fixing protrusion.

14. The electronic device of claim 13, wherein the vibration-proof member further includes a curved surface at a lower end of the vibration-proof member disposed opposite to the upper end.

15. The electronic device of claim 10, wherein the fixing protrusion is formed as a cylinder having a diameter corresponding to a diameter of the insertion hole of the vibration-proof member, and
wherein the extended shoulder of the fixing protrusion extends outwardly from one end of the cylinder and has a diameter greater than the diameter of the insertion hole of the vibration-proof member.

16. The electronic device of claim 13, wherein the supportable abutment of the vibration-proof member has a depth corresponding to a thickness of the extended shoulder of the fixing protrusion.

17. The electronic device of claim 10, further comprising:
a reinforcing plate fastened to the surface of the housing, wherein the fixing protrusion is formed on the reinforcing plate.

18. The electronic device of claim 10, wherein the vibration-generating component is a speaker.

19. An electronic device comprising:
a housing;
a vibration-generating component within the housing;
a vibration-proof member formed of an elastic material in a shape of a column, including:
an insertion hole aligned to a longitudinal axis of the column,
an engaging groove formed along an outer lateral surface of the vibration-proof member,
wherein the vibration-proof member couples with the vibration-generating component through the engaging groove; and
a fixing protrusion protruding from a surface of the housing, the fixing protrusion including an extended shoulder disposed at an end thereof, the fixing protrusion insertable into the insertion hole of the vibration-proof member,
wherein the fixing protrusion is configured to be inserted to the insertion hole such that the vibration-proof member prevents vibrations generated in the vibration-generating component from being transmitted to the fixing protrusion inserted to the insertion hole.

20. The electronic device of claim 19, wherein the vibration-proof member further includes a supportable abutment formed on an entirety of a circumference for an interior of the insertion hole at an upper end of the vibration-proof member, the supportable abutment having a depth corresponding to a thickness of the extended shoulder of the fixing protrusion, and supporting the extended shoulder of the fixing protrusion.

* * * * *